United States Patent [19]
Landis et al.

[11] Patent Number: 5,561,461
[45] Date of Patent: Oct. 1, 1996

[54] APPARATUS AND METHOD FOR ACCURATE SETTING OF TIME OF DAY CLOCK IN A VIDEO RECEIVER

[75] Inventors: Michael D. Landis, Fishers; Gabriel A. Edde, Indianapolis, both of Ind.

[73] Assignee: Thomson Consumer Electronics, Inc., Indianapolis, Ind.

[21] Appl. No.: 362,284

[22] Filed: Dec. 22, 1994

[30]   Foreign Application Priority Data

Jul. 18, 1994 [GB] United Kingdom .................... 9414447

[51] Int. Cl.$^6$ .................................................. H04N 07/08
[52] U.S. Cl. ........................... 348/725; 348/460; 348/461; 348/473; 368/10; 386/95
[58] Field of Search ..................................... 348/460, 461, 348/464, 465, 467, 468, 473, 476, 478; 358/335; 340/825.21; 368/1, 9, 10, 46–52

[56]   References Cited

U.S. PATENT DOCUMENTS

| | | | |
|---|---|---|---|
| 4,099,372 | 7/1978 | Beyers, Jr. ................................ | 58/85.5 |
| 4,993,003 | 2/1991 | Fechner et al. ........................... | 368/47 |
| 5,329,500 | 7/1994 | Baik et al. ................................ | 368/10 |
| 5,334,957 | 8/1994 | Wachob et al. .......................... | 340/825.21 |

FOREIGN PATENT DOCUMENTS

| | | | |
|---|---|---|---|
| 0337336B1 | 10/1989 | European Pat. Off. ........ | H04N 7/087 |
| 0562410A1 | 9/1993 | European Pat. Off. ......... | G04G 5/00 |
| 0640897A1 | 3/1995 | European Pat. Off. ......... | G04G 5/00 |

OTHER PUBLICATIONS

Draft/North American Broadcast Teletext Specification Sep. 20, 1963 (NABTS).

*Primary Examiner*—Victor R. Kostak
*Assistant Examiner*—Nathan Flynn
*Attorney, Agent, or Firm*—Joseph S. Tripoli; Peter M. Emanuel; Robert D. Shedd

[57]   ABSTRACT

A television receiver includes a decoder for decoding a data component of a television signal, such as extended data services (EDS) data. The data component includes data representative of time of day information. A controller in the receiver processes the time of day information to set the time of day stored in the television receiver to a time value that is accurate to seconds.

16 Claims, 2 Drawing Sheets

APPARATUS AND METHOD FOR ACCURATE SETTING OF TIME OF DAY CLOCK IN A VIDEO RECEIVER

FIELD OF THE INVENTION

The invention concerns television receivers having circuitry for decoding closed captioning information that is included in a television signal.

BACKGROUND

Keeping the correct time of day has traditionally been a problem for video receivers in televisions and in video cassette recorders (VCR). The user has been the only source of knowledge for programming the current time. However, typical consumers do not know how, or do not wish, to set or correct the internal clock. As a result, the display on many receivers is never changed from the power-up default display of flashing "12:00 A.M.".

With the incorporation of Extended Data Services (EDS) information into television signals in the United States, current time information will be available in the television signal. EDS information is a data component of the signal that may be included in the vertical blanking interval of an NTSC standard television signal. In particular, EDS data may be included in line 21 of field 2 in an encoded form like that of closed caption data. EDS and captioning will share the bandwidth of line 21 field 2 in a time multiplexed manner. EDS will offer a wide range of useful information such as: program title, network name, and current time of day.

The format of EDS data is specified in the EIA-608 standard for line 21 data services for NTSC television signals. The EDS data component of a television signal is organized in packets of data bytes. Each packet conveys one piece of information, e.g., the current time of day. Each line 21 of field 2 provides two bytes of EDS data. Each byte includes 7 bits of data (bits 0 through 6) and a parity bit (bit 7). Particular data byte values occurring in the first byte of any line 21 of field 2 indicate the start of a packet. Each "start" data byte also defines a "class" of information that is included in the packet. For example, a "current" class packet includes information pertaining to the current program that is being viewed. A "miscellaneous" class packet includes various types of information such as time of day information. As an example, a value of $01_h$ (i.e., $01_{hex}$) in the first data byte in line 21 of field 2 indicates the start of a "current" class packet while a value of $07_h$ indicates the start of a "miscellaneous" class packet.

The data byte following a "start" byte, i.e. the second byte in the particular occurrence of line 21, determines the "type" of information in the packet. For example, if the data byte following a "miscellaneous" packet start byte has the value $01_h$, the packet "type" is a "time of day" packet. A time-of-day packet includes six bytes (in addition to the start, type, and end bytes) formatted as shown in Table 1. The six bytes define the current time of day relative to GMT. The valid ranges for the various fields are shown in Table 2. In Table 1, the "D" bit in byte 2 determines if daylight saving time is currently being observed, the "L" bit in byte 3 determines if the current year is a leap year, and the "Z" bit in byte 4 determines if the current time in seconds should be set to zero. In Table 2, a "day" value of 1 in byte 5 indicates Sunday and a value of 7 indicates Saturday. The "year" value in byte 6 is selected such that adding the value to 1990 produces the current year.

TABLE 1

| Byte | Data | b6 | b5 | b4 | b3 | b2 | b1 | b0 |
|---|---|---|---|---|---|---|---|---|
| 1 | minutes | 1 | m5 | m4 | m3 | m2 | m1 | m0 |
| 2 | hours | 1 | D | h4 | h3 | h2 | h1 | h0 |
| 3 | date | 1 | L | d4 | d3 | d2 | d1 | d0 |
| 4 | month | 1 | Z | — | — | m3 | m2 | m1 | m0 |
| 5 | day (of week) | 1 | — | — | — | d2 | d1 | d0 |
| 6 | year | 1 | y5 | y4 | y3 | y2 | y1 | y0 |

TABLE 2

| Byte | Data | Bits | Valid Range |
|---|---|---|---|
| 1 | minute | m5–m0 | 0–59 |
| 2 | hour | h4–h0 | 0–23 |
| 3 | date | d4–d0 | 0–31 |
| 4 | month | m3–m0 | 0–12 |
| 5 | day (of week) | d2–d0 | 1–7 |
| 6 | year | y5–y0 | 0–63 |

Because time of day is defined in terms of GMT, information defining the time zone of the user is necessary to determine the correct local time. The time zone of the source of a video signal is provided in another type of packet in the miscellaneous class of EDS packets, namely the "local time zone & DST" packet type. The time zone packet includes two bytes. In the first byte, bits b4 through b0 specify a delay in hours (range of 0–23) from GMT for the location of the source of the video signal. Bit b5 of the first byte determines whether the locality of the signal source observes daylight saving time. If bit b5 is a logic 0, i.e. daylight saving time not observed, the "D" bit in the time of day packet is ignored.

The local time zone packet is only inserted in the video signal if reception of the signal is limited to an area within a single time zone. For areas on time zone boundaries, the required time zone information must be entered into the receiver by a user when the receiver is powered up, e.g., as a step executed during a menu of initialization procedures.

As shown in Table 1, the current time of day in EDS data is specified in hours and minutes, but not seconds. A single bit "Z" is provided to indicate if the seconds value is zero at the time of the EDS transmission. If the current time of day is transmitted exactly at the top of a minute, i.e. zero seconds, the "seconds" bit could be set indicating that the receiver's internal seconds clock should be reset to zero. However, providing time information using a "seconds" bit has at least two drawbacks. First, a time of day packet may be transmitted only occasionally (e.g., once every ten minutes) and randomly. A long time interval might be required before the time of day information was transmitted with a zero seconds value. Second, the "zero seconds" bit might not be set, even though it is exactly the top of a minute. In this case the receiver would never have the exact correct time. Correct time, including the seconds component, may be important when controlling features such as starting to record a television program in a video cassette recorder (VCR). Inaccuracies in the seconds component may result in recording beginning early (a portion of an unwanted program is recorded) or late (the beginning of a desired program is not recorded).

SUMMARY OF THE INVENTION

The invention resides, in part, in recognition of the described problem and, in part, in providing a solution to the problem. In accordance with an aspect of the invention, a television receiver including a closed caption signal decoder is responsive to a data component of a television signal, such as extended data services (EDS) data, that is representative of current time of day for setting a current time stored in the television receiver to the correct current time including seconds.

BRIEF DESCRIPTION OF THE DRAWINGS

The invention may be better understood by referring to the enclosed drawing in which.

DETAILED DESCRIPTION

Figure 1:
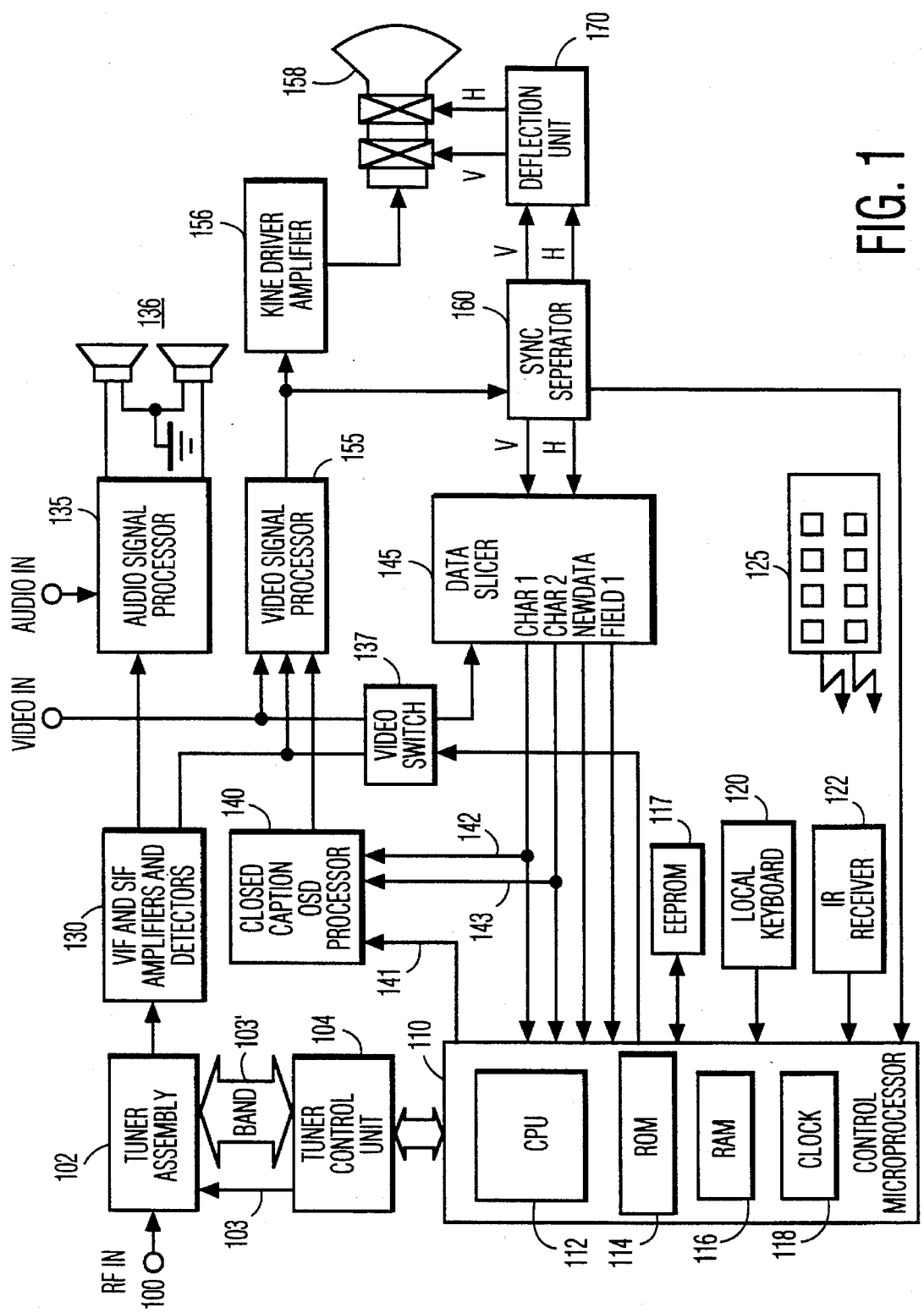
FIG. 1 is a block diagram of a portion of a television receiver suitable for implementing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer (μC) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116. RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, that it may be desirable to use a suitable form of standby power to preserve its contents when the receiver is turned off.

Microcomputer (or controller) 110 generates a control signal for causing tuner control unit 104 to control tuner 102 to select a particular RF signal, in response to user-entered control signals from local keyboard 120 and from infrared (IR) receiver 122. Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically-erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to a Kine Driver Amplifier 156 for amplification and then applied to the guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam. That portion of FIG. 1 described thus far is known, for example, from the RCA CTC-140 color television manufactured by Thomson Consumer Electronics, Inc., Indianapolis, Ind.

An embodiment of the invention will now be described with reference to the remainder of FIG. 1, and to the flowchart of FIG. 2. In FIG. 1, DATA SLICER 145 receives closed caption data at a first input from VIF/SIF amplifier and detector unit 130, and at a second input from the VIDEO IN terminal via a VIDEO SWITCH 137 which selects the proper source of closed-caption data under control of controller 110. DATA SLICER 145 decodes the data component of the television signal and supplies decoded data such as closed-caption data and EDS data to CLOSED CAPTION OSD PROCESSOR 140 via lines 142 and 143. DATA SLICER 145 also supplies closed-caption status data, such as a NEWDATA signal and a FIELD signal, to controller 110. The FIELD signal indicates whether the received data is in field 1 or field 2 of the video signal. If extended data services (EDS) data is included in the video signal, the EDS data will be in line 21 of field 2. Under control of controller 110, via control line 141, CLOSED CAPTION OSD PROCESSOR 140 generates character signals, and applies them to an input of video signal processor 155, for inclusion in the processed video signal.

The system in FIG. 1 also includes a CLOCK feature 118 that is included in and controlled by controller 110. CLOCK 118 represents registers or memory locations where current time of day information is stored. Controller 110 is responsive to an interrupt at periodic intervals, e.g., a 60 Hz signal derived from the AC power supply voltage, for incrementing the current time of day data that is stored in CLOCK 118. The time is displayed on a display device such as a 7-segment display device (not shown in FIG. 1) that is mounted on a front panel of the television receiver or on kinescope 158. Either type of time display is controlled by controller 110. To display the time of day on kinescope 158, controller 110 transfers the time information to video signal processor 155 via on-screen display (OSD) processor 140. As a result, the time information is included in the video signal coupled to kinescope 158 and a time display is produced, for example, superimposed on the normal video image.

The current time in CLOCK 118 is checked and modified as required by controller 110. For example, controller 110 can modify the current time in response to time data input by a user (e.g., via IR remote 125). Alternatively, controller 110 can modify time of day in response to EDS information extracted from the video signal by data slicer 145.

Although EDS information is useful, EDS data may not be included in all television signals. Accessing EDS capability may require tuning to a particular channel that includes EDS data. For example, in the United States at the present time, only signals from Public Broadcasting Service (PBS) stations include EDS data. Thus, updating time of day information from EDS requires tuning to a PBS station and EDS data may be processed when a PBS station is tuned during normal use of the television receiver. However, normal use of the receiver does not ensure that PBS will be selected. Thus, the control program for controller 110 includes a routine that causes tuner 102 to automatically select a channel corresponding to PBS. The PBS channel information may be entered by a user via remote control 125, for example, during initial setup of the television receiver, and stored in RAM 116.

To avoid interfering with normal use of the receiver, automatic tuning of EDS occurs only when the television is not in use, i.e. "operating power" is inactive and "standby power" is active. In FIG. 1, both standby power STBY and operating power PWR are provided by power source 180. Standby power STBY is active as long as power source 180 is coupled to a source of power, e.g., plugged into an AC power outlet. Operating power PWR is active only when "power on" is activated by, for example, pressing the appropriate button on remote control 125. Typically, most features shown in FIG. 1 are coupled to operating power only and function only when operating power is activated. However, to automatically tune to an EDS signal source and process EDS data during the power off state, features including controller 110, tuner 102–104 and data slicer 145 receive standby power and remain active after operating power is turned off. Controller 110 detects the power off condition and, using standby power, performs the described automatic tuning and EDS processing procedures.

Rather than relying on user-entered PBS channel information, a channel that is a source of EDS data may be identified by "scanning" all active channels. In the system shown in FIG. 1, a channel scan involves controller 110 producing control signals for tuner control unit 104 that cause tuner assembly 102 to select each active channel. As each channel is tuned, the video signal produced by unit 130 is processed by data slicer 145 to extract data that is present. The extracted data is tested by controller 110 to determine if extracted data is EDS data. For example, detecting EDS data codes during line 21 of field 2 indicates that EDS data is present. Once an EDS signal is detected, the tuning information for the signal is stored in RAM 116 so that the channel carrying EDS data can be tuned when controller 110 executes the automatic EDS tuning routine. To avoid interfering with normal use of the television receiver, the EDS channel search can occur during the "power off" condition of the television receiver that is described above. Alternatively, an EDS data source can be identified as part of a channel scan used in certain television receivers during initial setup of the receiver to identify all active channels and create a channel "scan list".

When EDS data is received, the system shown in FIG. 1 processes the data under control of a program executed by controller 110 to maintain the correct time of day in CLOCK 118. The program is stored, for example, in EEPROM 117 and is illustrated functionally in the flowchart in FIG. 2. Briefly, execution of the program causes the system to determine a time difference between a time-of-day value in CLOCK 118 and a time-of-day value in EDS time-of-day packets. The value of the time difference determines how the time-of-day value stored in CLOCK 118 is modified maintain an accurate time. In FIG. 2, it is assumed that the current time of day in hours, minutes, and seconds is stored in respective memory locations or registers, e.g., within controller 110, that are designated "tod_hours", "tod_minutes", and "tod_seconds". Similarly, hours and minutes data from incoming EDS time-of-day data is stored in locations that are designated "eds_hours" and "eds_minutes".

Figure 2:
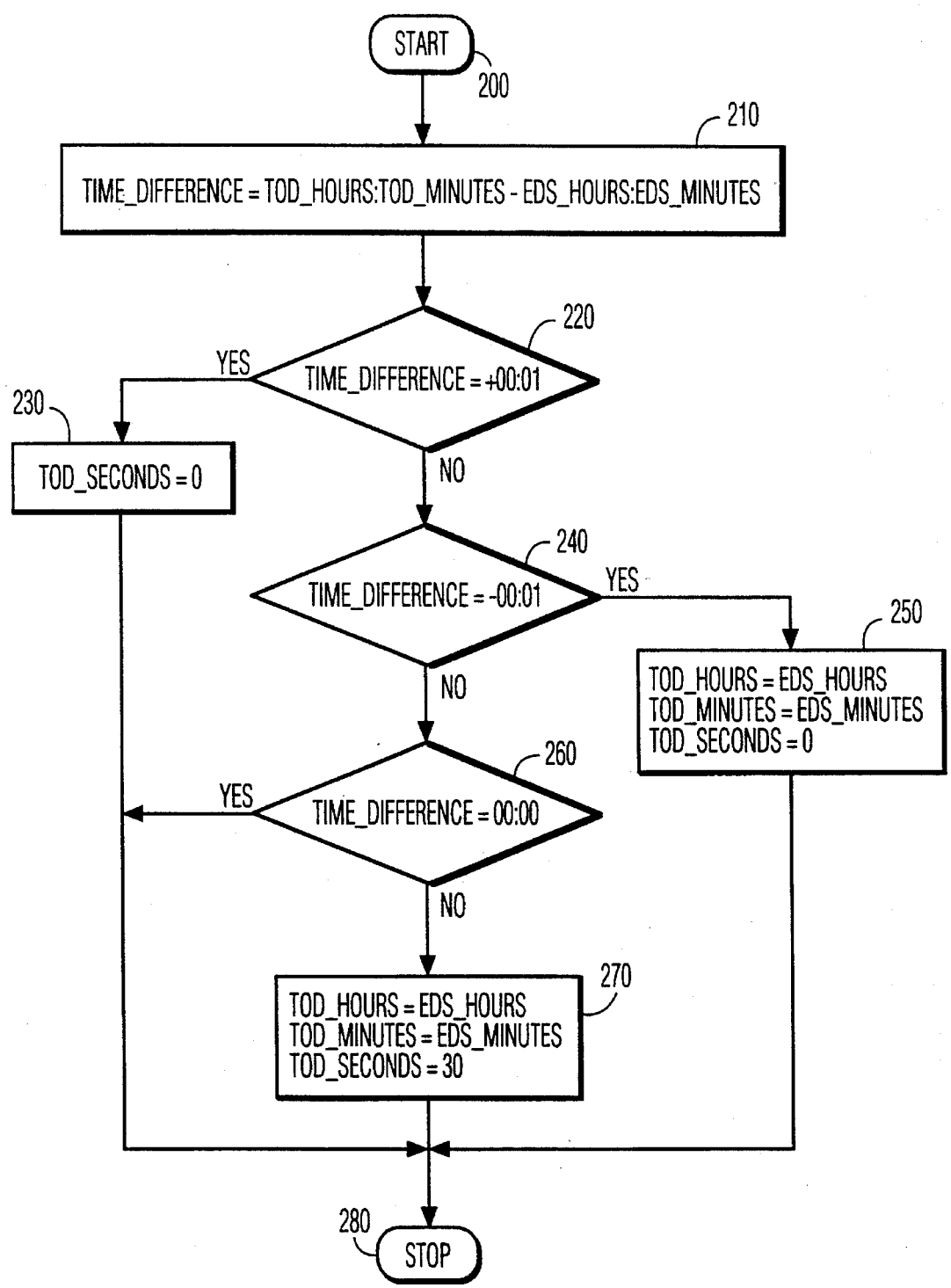
FIG. 2 is a flowchart showing a portion of the program of controller 110 of FIG. 1.

In FIG. 2, the routine begins at step 200 when an EDS time of day packet is received. At step 210, the EDS time of day in hours and minutes is subtracted from the current time in hours and minutes that is stored in the system to produce a value designated "time_difference". At step 220, time_difference is evaluated. If time_difference is equal to a positive one minute, i.e. the current stored time exceeds the EDS time by 1 minute, the current stored seconds, i.e. tod_seconds, is set to 0. If time_difference is not equal to positive one minute, step 220 is followed by another evaluation at step 240 to determine if time_difference is equal to negative one minute. If so, the current time is set to the EDS time at step 250, including setting current seconds to 0. If time_difference is neither positive one minute nor negative one minute, step 240 is followed by step 260 where a third evaluation occurs to determine if time_difference is equal to 0. If not (i.e. time_difference has a value other than 0, +1 minute, or −1 minute), execution continues after step 260 at step 270 where the current hours and minutes is set to EDS hours and minutes, and tod_seconds is set to 30. The routine is exited at step 280 following steps 230, 250 and 270, and if time_difference equals 0 when tested at step 260.

The operation of the system as depicted in FIG. 2 may be summarized as follows:

1) if the internal time ('hours' & 'minutes') equals the EDS time, then do nothing ["YES" at step 260];

2) if the internal time ('hours' & 'minutes') is two or more minutes different from the EDS time, then set the internal time ('hours' & 'minutes') equal to the EDS time and set the internal 'seconds' time to thirty ["NO" at step 260];

3) if the internal time ('hours' & 'minutes') is one minute behind the EDS time, then set the internal time ('hours' & 'minutes') to the EDS time and set the internal 'seconds' time to zero ["YES" at step 240];

4) if the internal time ('hours' & 'minutes') is one minute ahead of the EDS time, then set the internal 'seconds' time to zero ["YES" at step 220].

When the system first powers up, its internal clock will not be set, and operation 2 above (time_difference>2 minutes, i.e. "NO" at step 260) will occur after the first EDS time of day message is received. As a result, the internal clock will be between 0 and 30 seconds ahead of the correct time or between 0 and 30 seconds behind the correct time. Operation 2 is not repeated, unless power fails, because a difference between the internal time and the EDS time of more than one minute is required for operation 2 to occur.

Operation 1 (time_difference=0, i.e. "YES" at step 260) occurs most of the time. The occurrence of operation 1 indicates that no information is available regarding time error because internal time equals EDS time to the resolution of minutes. As a result, internal time is presumed to be correct and is not altered.

After the first time adjustment, internal time may be either ahead of the correct time or behind the correct time, but by thirty seconds at the most. If internal time is behind correct time, eventually an EDS message will be received specifying an EDS time that is one minute ahead of internal time. For example, the correct time seconds value is 05, but the internal seconds value is 55. Operation 3 (time_difference=−1 minute, i.e. "YES" at step 240) occurs causing internal time to jump ahead to the start of the next minute. As a result, the error between the correct time and internal time is decreased. Because the error is decreased, operation 1 is even more likely to occur each time a new EDS time message is received. However, due to the random timing of the transmission of EDS time-of-day messages, eventually operation 3 occurs enough times to cause internal time to correspond exactly to correct time.

If after the first time adjustment internal time is ahead of correct time, eventually an EDS message will be received where EDS time is one minute behind internal time. In this case, operation 4 occurs (time_difference=+1 minute, i.e. "YES" at step 220), and internal time jumps back to the start of the present minute. The error is again decreased and subsequent EDS messages eventually ensure that internal time corresponds exactly to correct time.

Although the invention is described in regard to EDS data included in line 21 of field 2 of an NTSC standard television signal, a data component including time of day information may be provided in a manner other than that described. For example, a data component may be included during the vertical blanking interval in other field and line intervals, e.g. field 1 and line 16. The invention may also be useful in regard to television signals that comply with standards other than the NTSC standard. For example, a digital television signal, such as that processed by the DSS™ broadcast satellite signal receiver manufactured by Thomson Consumer Electronics, Inc. of Indianapolis, Ind., may include a stream of data bits organized in packets of related data rather than according to line and field intervals. Certain data packets in the digital data stream may represent a data component that, when processed in accordance with principles of the invention, provides time of day information.

In addition to modifications of the described signal format, the arrangement shown in FIG. 1 may be modified. For example, data slicer 145 may be combined with controller 110 into a single integrated circuit such as in the MC68HC05CC1 microcomputer that is manufactured by Motorola Semiconductor, Austin, Tex. Other functions shown as separate features in FIG. 1, such as closed caption OSD processor 140, may also be included with unit 110 and/or unit 145 in a single integrated circuit. These and other modifications are intended to be within the scope of the following claims.

We claim:

1. Apparatus comprising:

a memory for storing data representative of a first time of day value including a seconds component;

an input for receiving a television signal including a data component comprising data representative of a second time of day value lacking a seconds component; and a controller for processing said data component to provide said second time of day value;

said controller determining a time difference between said first time of day value and said second time of day value;

said controller changing said seconds component of said first time of day value to a first predetermined value in response to said time difference being within a range of values, and changing said seconds component of said first time of day value to a second predetermined value in response to said time difference being outside said range of values.

2. The apparatus of claim 1 wherein said controller changes said seconds component of said first time of day value to a value representative of thirty seconds in response to said time difference indicating that said first time of day value differs from said second time of day value by more than one minute.

3. The apparatus of claim 1 wherein said controller changes said seconds component of said first time of day value to a value representative of 0 seconds in response to said time difference indicating that said first time of day value differs from said second time of day value by one minute.

4. The apparatus of claim 1 wherein said controller changes said seconds component of said first time of day value to a value representative of thirty seconds in response to said time difference indicating that said first time of day value differs from said second time of day value by more than one minute; and said controller changes said seconds component of said first time of day value to a value representative of zero seconds in response to said time difference indicating that said first time of day value differs from said second time of day value by one minute.

5. Apparatus comprising:

a memory for storing data representative of a first time of day value including a seconds component;

a tuner responsive to a control signal for tuning a particular television signal from a plurality of input television signals to provide a tuned signal tending to include a data component comprising data representative of a second time of day value;

a decoder for decoding said data component to provide a data signal representative of data included in said data component; and a controller for generating said control signal causing said tuner to sequentially tune each of said plurality of input signals;

said controller processing said data signal as each of said plurality of input television signals is tuned by said tuner to detect a particular one of said plurality of input television signals that includes said data component comprising data representative of said second time of day value;

said controller generating said control signal during a control interval subsequent to the end of said plurality of tuning intervals for tuning said particular one of said plurality of input television signals;

said controller processing said data signal corresponding to said particular one of said plurality of television signals for determining a time difference representative of the amount that said first time of day value differs from said second time of day value; and said controller changing said seconds component of said first time of day value to a first predetermined value in response to said time difference indicating that said first time of day value differs from said second time of day value by a predetermined value.

6. The apparatus of claim 5 wherein said controller changes said seconds component of said first time of day value to a value representative of thirty seconds in response to said time difference indicating that said first time of day value differs from said second time of day value by more than one minute.

7. The apparatus of claim 5 wherein said controller changes said seconds component of said first time of day value to a value representative of zero seconds in response to said time difference indicating that said first time of day value differs from said second time of day value by one minute.

8. The apparatus of claim 5 wherein said controller changes said seconds component of said first time of day value to a value representative of thirty seconds in response to said time difference indicating that said first time of day value differs from said second time of day value by more than one minute; and said controller changes said seconds component of said first time of day value to a value representative of zero seconds in response to said time difference indicating that said first time of day value differs from said second time of day value by one minute.

9. Apparatus comprising:

a memory for storing data including data representative of a first time of day value comprising a seconds component;

a tuner responsive to a control signal for tuning a particular television signal from a plurality of input television signals to provide a tuned signal tending to include a data component;

means for entering tuning data representative of a particular one of said plurality input television signals including said data component;

a decoder for decoding said data component to provide a data signal representative of data included in said data component; and a controller for storing said tuning data in said memory and for generating said control signal responsive to said tuning data to tune said particular one of said plurality of input television signals;

said controller processing said data signal corresponding to said particular one of said plurality of input television signals to detect a portion of said data signal representative of a second time of day value;

said controller determining a time difference representative of the amount that said first time of day value differs from said second time of day value; and said controller changing said seconds component of said first time of day value to a first predetermined value in response to said time difference indicating that said first time of day value differs from said second time of day value by a predetermined value.

10. The apparatus of claim 9 wherein said controller changes said seconds component of said first time of day value to a value representative of thirty seconds in response to said time difference indicating that said first time of day value differs from said second time of day value by more than one minute.

11. The apparatus of claim 9 wherein said controller changes said seconds component of said first time of day value to a value representative of zero seconds in response to said time difference indicating that said first time of day value differs from said second time of day value by one minute.

12. The apparatus of claim 9 wherein said controller changes said seconds component of said first time of day value to a value representative of thirty seconds in response to said time difference indicating that said first time of day value differs from said second time of day value by more than 1 minute; and said controller changes said seconds component of said first time of day value to a value representative of zero seconds in response to said time difference indicating that said first time of day value differs from said second time of day value by one minute.

13. A method for maintaining a first time of day value, including a seconds component, stored in a television receiver, said method comprising the steps of:

receiving a television signal including a data component comprising data representative of a second time of day value lacking a seconds component;

processing said data component to provide said second time of day value;

determining a time difference between said first time of day value and said second time of day value; and changing said seconds component of said first time of day value to a first predetermined value in response to said time difference being within a range of values, and changing said seconds component of said first time of day value to a second predetermined value in response to said time difference being outside said range of values.

14. The method of claim 13 wherein the step of changing said seconds component of said first time of day value comprises changing said seconds component to a value representative of thirty seconds in response to said time difference indicating that said first time of day value differs from said second time of day value by more than one minute.

15. The method of claim 13 wherein the step of changing said seconds component of said first time of day value comprises changing said seconds component to a value representative of zero seconds in response to said time difference indicating that said first time of day value differs from said second time of day value by one minute.

16. The method of claim 13 wherein the step of changing said seconds component of said first time of day value comprises:

changing said seconds component of said first time of day value to a value representative of thirty seconds in response to said time difference indicating that said first time of day value differs from said second time of day value by more than one minute; and changing said seconds component of said first time of day value to a value representative of zero seconds in response to said time difference indicating that said first time of day value differs from said second time of day value by one minute.

* * * * *